United States Patent
Yoo

(10) Patent No.: US 8,004,580 B2
(45) Date of Patent: Aug. 23, 2011

(54) APPARATUS AND METHOD FOR MANAGING IMAGES OF MOBILE TERMINAL

(75) Inventor: Jin-Ook Yoo, Gyeongsangbuk-Do (KR)

(73) Assignee: LG Electronics Inc., Seoul (KR)

( * ) Notice: Subject to any disclaimer, the term of this patent is extended or adjusted under 35 U.S.C. 154(b) by 440 days.

(21) Appl. No.: 11/646,245

(22) Filed: Dec. 28, 2006

(65) Prior Publication Data
US 2007/0154115 A1    Jul. 5, 2007

(30) Foreign Application Priority Data
Dec. 30, 2005   (KR) .................. 10-2005-0136182

(51) Int. Cl.
*H04N 5/76* (2006.01)
(52) U.S. Cl. ............ 348/231.2; 348/211.11; 348/333.02
(58) Field of Classification Search .................. 715/208, 715/732; 348/207.1, 211.1, 211.2, 231.99, 348/321.2, 231.3, 333.02
See application file for complete search history.

(56) References Cited

U.S. PATENT DOCUMENTS

| 6,903,773 B1 * | 6/2005 | Fushimoto ............... 348/333.02 |
| 6,920,610 B1 * | 7/2005 | Lawton et al. ................ 715/209 |
| 2005/0010553 A1 | 1/2005 | Liu |
| 2005/0110879 A1 * | 5/2005 | Izume et al. ............... 348/231.2 |
| 2005/0162523 A1 * | 7/2005 | Darrell et al. .............. 348/211.2 |
| 2007/0168868 A1 * | 7/2007 | Korzenko et al. ............. 715/732 |

FOREIGN PATENT DOCUMENTS

| EP | 1 533 714 A2 | 11/2004 |
| JP | 0928098 A2 | 7/1999 |
| JP | 2003-141030 A | 5/2003 |
| JP | 3535724 B2 | 6/2004 |
| JP | 2005-157615 A | 6/2005 |
| JP | 2005-166061 A | 6/2005 |
| JP | 2005-196709 A | 7/2005 |
| KR | 10-2005-0066072 A | 6/2005 |

* cited by examiner

*Primary Examiner* — Gevell Selby
(74) *Attorney, Agent, or Firm* — Birch, Stewart, Kolasch & Birch, LLP

(57) ABSTRACT

An apparatus for managing images of a mobile terminal includes: a storage unit for storing a plurality of images; and a control unit for creating a script for a particular image according to a user instruction, and linking a second image stored in the storage unit or in an external device to the created script. The images stored in the mobile terminal are not simply kept in arranged data but an interconnection (scenario type configuration) is set among the images to allow a user to variably use the images. In addition, because the images have a logical relationship with each other, user convenience can be enhanced in managing numerous digital images.

7 Claims, 5 Drawing Sheets

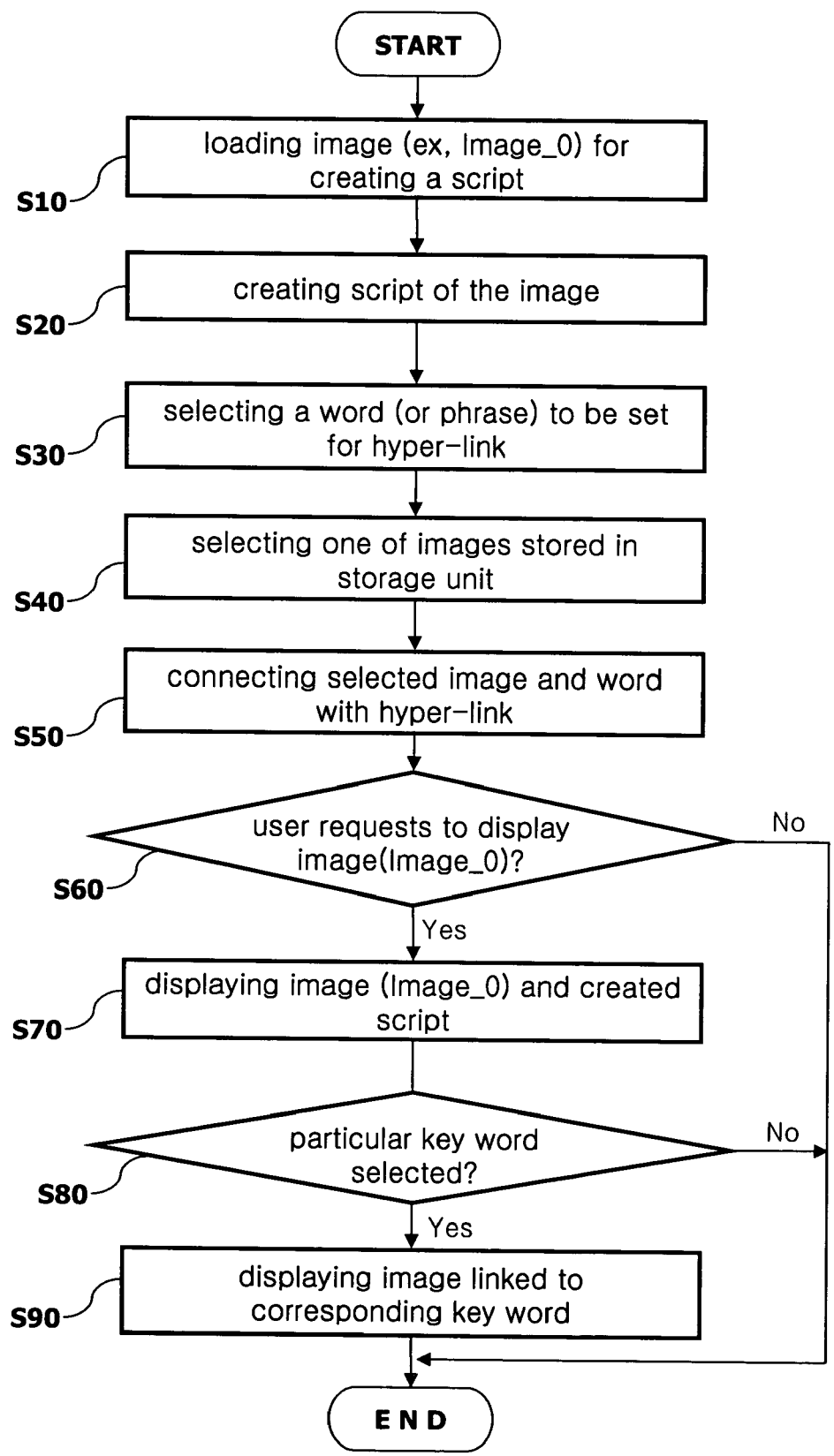

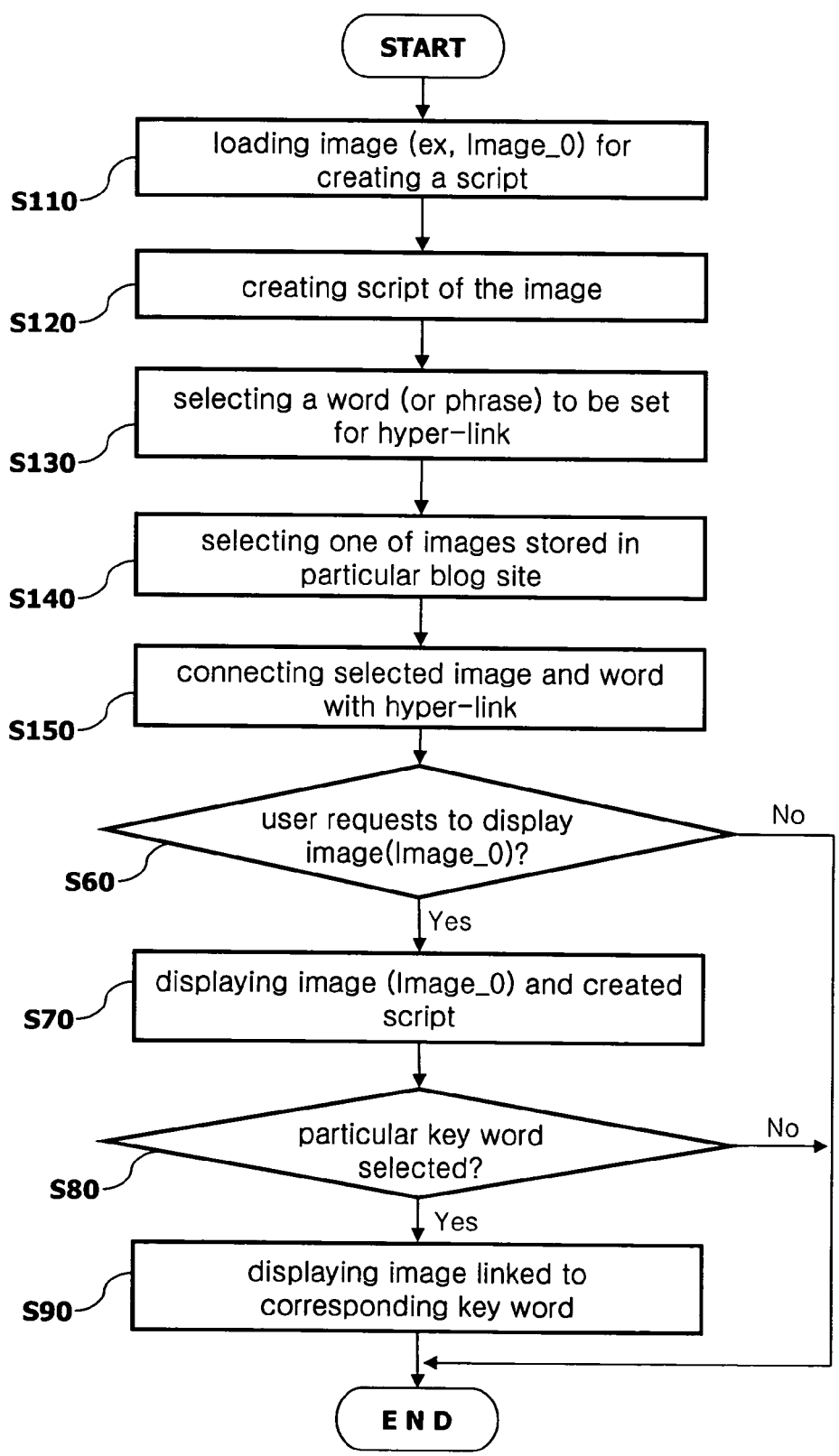

APPARATUS AND METHOD FOR MANAGING IMAGES OF MOBILE TERMINAL

BACKGROUND OF THE INVENTION

1. Field of the Invention

The present invention relates to a mobile terminal and, more particularly, to an apparatus and method for more effectively managing digital images of a mobile terminal.

2. Description of the Related Art

Mobile communication systems were initially developed to support voice communication services, to provide user convenience during mobility and allow device portability. But as mobile communication technologies continue to develop, transferring of multimedia data (such as photos, video clips, etc. combined with audio data) via Internet access also has now become available in addition to simple voice communication services.

Also, as image capturing functions, such as those provided by a camera module, are implemented into mobile terminals, image processing and management of stored image files are necessary.

However, images that are typically stored in the related art mobile terminal are simply managed in a one-dimensional manner. Namely, images are stored in the form of digital files having a date or file name associated thereto, which allows image searching by date or by file name. As digital image capturing technology improves and as storage memory becomes cheaper, users can be more easily take digital photographs (or video clips) and a large number of digital image files may exist in storage. Thus, if there are numerous digital image files stored in memory or for digital image files that have been stored by the user some time ago, the user can not easily remember the details about each image that was captured, and it may be difficult to determine where particular images are stored. As such, there are difficulties in effectively managing countless digital image files.

In addition, the user can only view the stored digital image files in a sequential manner through the related art user interface, such as a thumbnail-type viewing function, a preview function, or the like. Thus, user convenience is not sufficiently taken into consideration with respect to managing stored digital images in a practical manner.

SUMMARY OF THE INVENTION

An important aspect of the present invention is that the present inventor recognized certain drawbacks of the related art, as mentioned above. As a result, the present inventor provided a solution to such drawbacks as follows.

An exemplary feature of the present invention is to provide an apparatus and method that allows more effectively managing of digital images for user devices (such as a mobile terminal), which allows the user to add descriptions (such as script or text) to each image and providing an association or relationship among numerous images by use of keywords or phrases.

Additional aspects and features of exemplary embodiments of the invention will be set forth in part in the description which follows and in part will become apparent to those having ordinary skill in the art upon consideration of the following or may be learned from practice of the invention. Certain aspects and advantages of the invention may be realized and attained as particularly pointed out in the appended claims.

BRIEF DESCRIPTION OF THE DRAWINGS

The invention will be described in detail with reference to the following drawings:

FIG. 4 is a flow chart illustrating the processes of an exemplary method for creating and displaying a script of a digital image according to the first embodiment of the present invention; and FIG. 5 is a flow chart illustrating the processes of an exemplary method for creating and displaying a script of a digital image according to the second embodiment of the present invention.

DETAILED DESCRIPTION OF THE INVENTION

Exemplary embodiments of the present invention will now be described with reference to the accompanying drawings.

Embodiments of the present invention provide an apparatus and method that allow the user to add a description (such as a script, phrase, short sentence, etc.) to a digital image (i.e., still images, video, animation, graphics, etc.), which are implemented in a user device (such as, a mobile terminal, PDA, user client device, laptop computer, mobile platforms, etc.). This allows the user to add meaningful content (descriptions or explanations) to each digital image stored in the mobile terminal, which results in more effective storage and retrieval of the description-added digital images.

Here, the description may also be referred to as metadata, indexes, cataloging tags, key words, text, or the like.

In addition, according to the exemplary embodiments of the present invention, the user can set (or otherwise establish) a link (or other type of association, relationship, connection, etc.) for a particular digital image with respect to other digital images (obtained from an internal or external source) by using the particular keywords, phrases or short scripts that can be added to the digital image. This allows the user to manage and retrieve the stored digital images in a scenario-based manner. Namely, certain stored digital images may be associated with each other based upon a common theme, subject or topic that can be specified by the user, instead of (or in addition to date and time information).

For example, as location identification and positioning technology (e.g., GPS techniques, triangulation methods, longitude/latitude information, etc.) are available for mobile terminals, such information may be associated with photos or video captured by the camera of the mobile terminal by the user who may travel to various places around the world.

Figure 1:
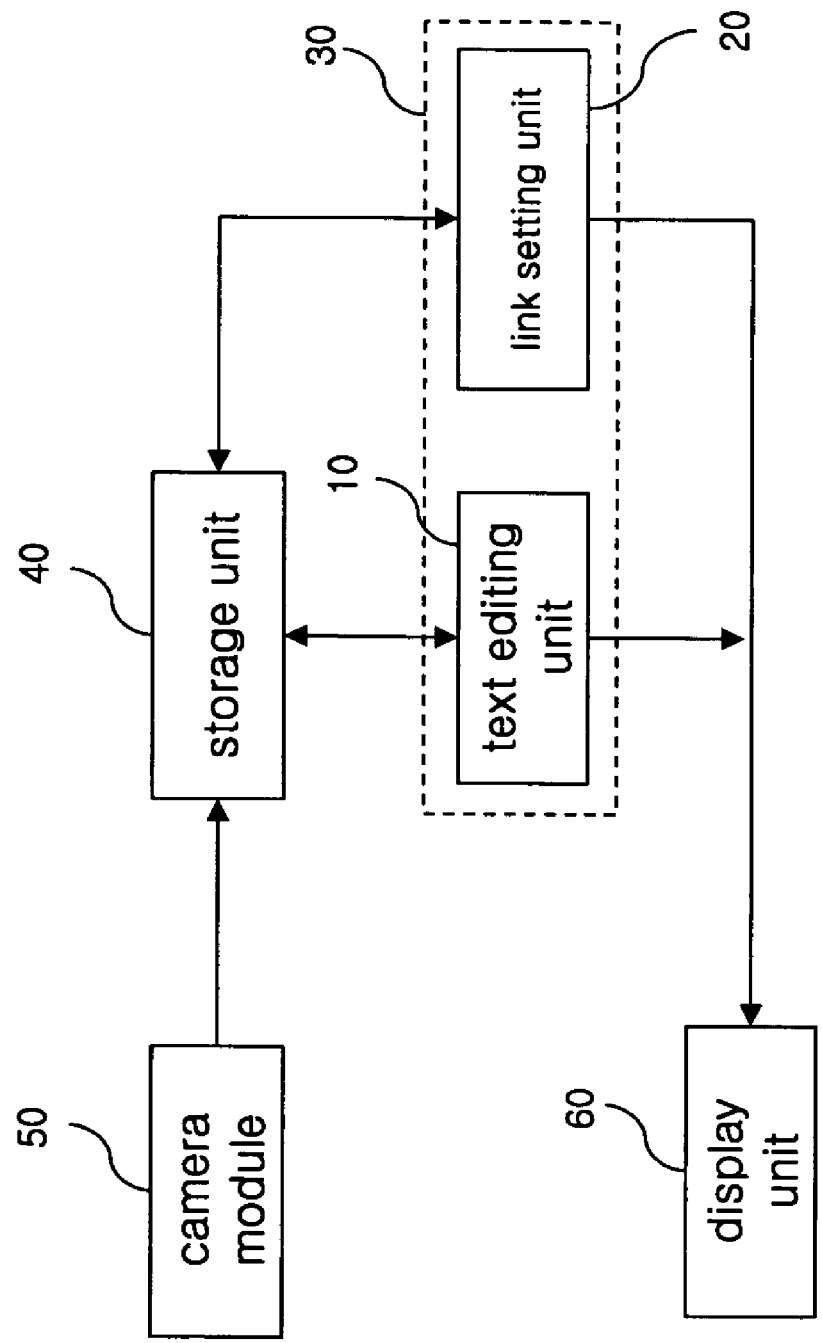
FIG. 1 is a schematic block diagram showing an exemplary structure of an apparatus for managing digital images of a mobile terminal according to an exemplary embodiment of the present invention.

FIG. 1 is a schematic block diagram showing the structure of an exemplary apparatus for managing digital images of a mobile terminal according to an exemplary embodiment of the present invention.

As shown in FIG. 1, the apparatus for managing digital images according to the present invention may include: a storage unit 40 (such as a memory, storage media, etc.) for storing images captured by a camera module 50 (or other image capture device or module) or received from an external source (such as, from a network server via a wired or wireless access interface); a control unit 30 (such as, a microprocessor, etc.) for performing adding, editing and deleting of a script (or other description) for a digital image according to a user selection and generating a single content item by linking related digital images to a particular phrase (or keyword) of the script; and a display unit 60 for displaying contents generated by the control unit 30.

Here, the wireless interface may be related to GSM, CDMA, OFDM, IEEE 802.11x technology (such as Wi-Fi, Wi-bro, etc.), OMA, Bluetooth, USB connectivity, but not limited to these examples.

The control unit 30 may include a text editing unit 10 (such as, a word processing function module, character input means, etc.) that allows the user to add, edit and delete a desired description (or script) for the user selected digital image; and a link setting unit 20 (or other device or module for establishing an association, a connection, a relationship, etc.) for establishing a link (relationship, association, etc.) with other digital images having a common phrase (or keyword) of the script according to user instructions.

Figure 2:
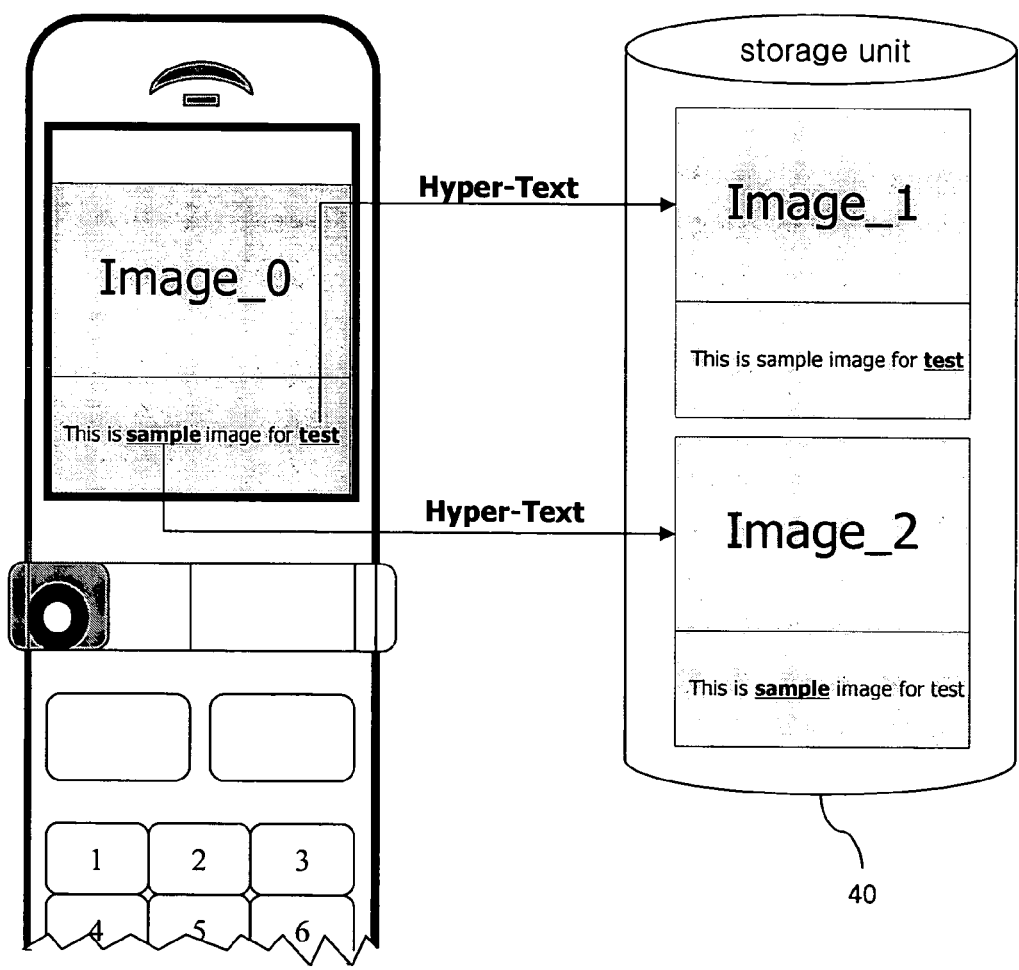
FIG. 2 is a view showing a concept of an exemplary method for managing digital images according to a first embodiment of the present invention.

FIG. 2 is a view showing a concept of an exemplary method for managing digital images according to a first embodiment of the present invention. Specifically, FIG. 2 shows an exemplary method for setting a digital image stored in a mobile terminal to be linked to different digital image(s) also stored in the mobile terminal and managing these digital images, while FIG. 4 is a flow chart illustrating the processes of an exemplary method for creating a script of a digital image and displaying it according to the first embodiment of the present invention.

The first embodiment of the present invention will now be described with reference to FIGS. 2 and 4.

When the user wants to add a script (or description) to a particular digital image (e.g., Image_0), the control unit 30 loads the corresponding digital image (Image_0) from the storage unit 40 according to a user instruction (step S10), and executes the text editing unit 10. And then, the control unit 30 waits for inputs (such as text entries) from the user.

When text inputting is available according to an execution of the text editing unit 10, as shown in FIG. 2, the user may create a script or other description (e.g., "this is sample image for test") by using various input formats (such as English, foreign languages, special characters, etc.) (step S20).

When creating of the script (or description) is completed, the user determines whether to set an association (e.g., a keyword, hyper-link, etc.) for a certain word (or phrase) of the script, and selects the desired word or phrase (e.g., the word "sample") (step S30). And then, the user selects a link setting function (or menu) to establish an appropriate relationship or association.

Here, it can be understood that the description inputting and keyword selection may be implemented in various forms. For example, after the user selects a certain digital image, a separate text inputting screen (or window) may be displayed to the user together with the selected digital image or separate therefrom. The text inputting screen may be shown as a pop-up window, a drop down window, or the like that may or may not overlap with the selected digital image. The text inputting screen may be translucent, semi-translucent or non-translucent. Additionally, the user's voice inputs may also be converted into corresponding text by using voice recognition software.

When the link setting function is selected, the control unit 30 executes the link setting unit 20 to thus display (or otherwise provide) a list of digital image files stored in the storage unit 40 on the display unit 60 (and/or other output means such as a speaker) so that the user can select a desired image.

When one of the displayed images (e.g., Image_1) is selected by the user (step S40), the link setting unit 20 marks or indicates the word (e.g., sample→sample) using a block or other graphic indicator to show that such is selected as a keyword, and sets a link or association (e.g., a hyper-link) with the image (Image_1) (step S50). Linking of a different key word ('test') of the script to an image (e.g., Image_2) can be performed by repeating the above-described processes (steps S30 to S50).

Here, it can be understood that the link setting procedure may be achieved in many ways. The user may move a cursor or other screen indicator using the buttons on a keypad, other input keys, a touch-screen input device, or the like to allow selection of the desired word(s). The word(s) to be selected may be highlighted or some other graphic indication may be shown to allow user selection thereof.

The selected word(s) may be linked, connected or associated by means of various protocol formats. For example, the connection (or link) may be limited to digital image files within the storage medium in the mobile terminal itself. Also, the selected word(s) may be in hyper-text format such that a hyper link is created to allow the user to connect with an external source (such as a network server) using hyper-text transfer protocol (HTTP) for accessing digital image files stored therein. Such may be useful for allowing the user to upload, download or otherwise access digital image files on the network server for accessing a so-called blog, a web page, or the like.

As the user of the mobile terminal be access various networks, uploading and downloading of information may take advantage of HSDPA, HSUPA, and other developing technologies that improve data transfer rates.

After a script is created for the selected digital image (Image_0) and an association (hyper-link) is set for a particular word of the script, the user can later edit or release the association (hyper-link) by editing the script.

When a previously set association (hyper-link) needs to be edited or released, the user can position an input cursor on a particular key word (e.g., 'sample' or 'test'). Then, the link setting unit 20 senses this user action and may display a link editing menu (add, release, correct, etc.) on the screen or provide the user with options for editing the previously set association.

When the user selects an item of the provided menu, the link setting unit 20 processes the corresponding keyword according to the selected menu item function (i.e., correct or release). When the 'release' item is selected, the link setting unit 20 provides a warning (such as, displaying a warning pop-up screen or providing an audible output) before the association (or link) previously set for the corresponding keyword is actually released (or removed). By asking the user's confirmation before actually removing an association, undesired releasing (or removing) of the association (link) due to a user's mistake or inadvertence can be prevented.

If the user instructs to delete the script created on the image (e.g., image_0) (step S20), the text editing unit 10 and the link setting unit 20 may delete the entire phrase ("this is sample image for test") of the corresponding script and release all associations (hyper-links) assigned to the script.

Here, it can be understood that the linking (or associating) function may be implemented in various ways to establish the desired association, relationship or connection between various digital images.

For example, instead of allowing the user to input keywords and phrases from scratch, certain pre-stored keywords or phrases may be provided to the user for easy selection thereof. Some keywords or phrases may be provided as default, or may be recommended to the user through keywords and phrases of previously stored digital images.

Such linking function may also be performed in an automatic manner. For example, facial recognition software may be employed such that the facial features of a person in the selected digital image are compared with the facial features of persons in other digital images (previously stored or obtained) such that a matching of facial features is obtained. The particular features of an object (instead of a person) may also be checked and compared for matching. As a result, the selected digital image may be assigned or provided with candidate keywords or phrases that were used in other similar digital images stored previously.

Figure 3:
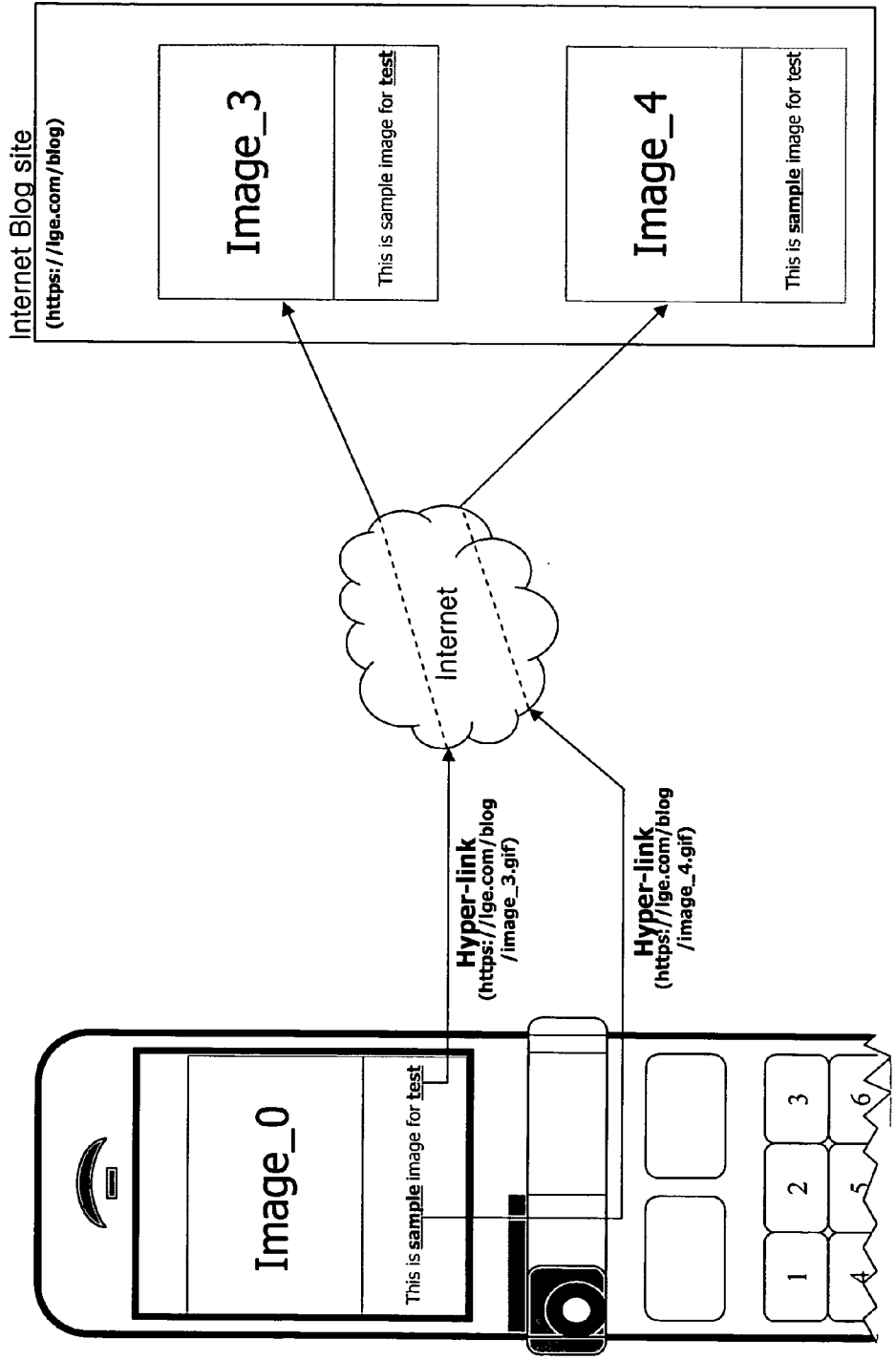
FIG. 3 is a view showing a concept of an exemplary method for managing digital images according to a second embodiment of the present invention.

FIG. 3 is a view showing a concept of an exemplary method for managing images according to a second embodiment of the present invention. Specifically, FIG. 3 shows an exemplary method for managing an image of a mobile terminal interworking with an online web page (e.g., a blog), and FIG. 5 is a flow chart illustrating the processes of a method for creating and displaying a script of an image according to the second embodiment of the present invention.

The second embodiment of the present invention will now be described with reference to FIGS. 3 and 5.

When the user wants to add a script to a particular image (e.g., Image_0), as described above with respect to the first embodiment of the present invention, the control unit 30 loads the corresponding image (Image_0) from the storage unit 40 according to a user instruction (step S110) and executes the text editing unit 10. Thereafter, text inputting from the user is awaited.

As shown in FIG. 3, when the user completes the creating of a script by inputting text (e.g., Korean, English, or special characters, etc.) (step S120) and designates a word (e.g., 'sample') to be set for association (e.g., create a hyper-link) (step S130), the control unit 30 executes the link setting unit 20.

When the link setting unit 20 is executed, it may display a list of image digital files stored in a corresponding web site (or server) on the display unit 60 to allow the user to access a particular blog site (pre-set internet site or a network server of a mobile terminal) and select a desired digital image therefrom.

When one (e.g., Image_3) of the displayed digital images is selected by the user (step S140), the link setting unit 20 marks the desired word (e.g., sample→sample) the desired word as a key word of the hyper-link, and sets a link with the digital image (Image_3) (step S150). Linking of a different key word ('test') of the script to a digital image (e.g., Image_4) can be performed by repeating the above-described processes (steps S130 to S150).

When a script is created for the digital image (Image_0) and a hyper-link is set for a particular word of the script, the user can correct or release the hyper-link in editing the script likewise as in the first embodiment of the present invention.

When the user positions a character input cursor on or over a particular key word (e.g., 'sample' or 'test') to correct or release the pre-set hyper-link, the link setting unit 20 senses this user action and may display a link editing menu (add, release, correct, etc.) on the screen. When the user selects 'correct' or 'release' of the menu items, the link setting unit 20 processes the corresponding key word according to the selected menu item (correct or release).

When the user instructs to delete the script created on the image (e.g., Image_0) (step S120), the text editing unit 10 and the link setting unit 20 delete the sentence ("this is sample image for test") of the corresponding script and release all the hyper-links allocated to the script, likewise as in the first embodiment of the present invention.

The first and second embodiments of the present invention describe an exemplary method for creating a description (script) of a selected digital image of the mobile terminal and generating an association (e.g., a connection or relationship such as a hyper-link).

In the first and second embodiments of the present invention, when the user selects the corresponding image (Image_0) (step S60), the mobile terminal according to the present invention may display the script ("this is sample image for test") of the corresponding image together with the selected image on the display unit 60 (step S70). When the user clicks the key word 'sample' or 'test' (step S80), one of the images Image_1~Image_4, namely, an image linked to the corresponding key word, is displayed (step S90).

Here, it should be noted that the method and/or procedures in the embodiments of the present invention may be implemented as codes or instructions under various software program formats (e.g., XML) that can be executed by the microprocessor (or other processing means) within the mobile terminal.

Additionally, the information (including the descriptions, key words, phrases, etc.) may contain sensitive matter or be personal in nature, transferring such information over wired and/or wireless access interfaces would require proper authentication, verification and other authorization techniques to ensure privacy. As such, various known authentication, verification, authorization, encryption techniques and the like may also be implemented together with the features of the embodiment(s) of the present invention.

As so far described, the apparatus and method for managing images of a mobile terminal according to the present invention may have at least the following advantages.

That is, according to the features of the present invention, digital images stored in the mobile terminal are not simply stored and arranged in a linear manner (i.e., without any meaningful connection or relationship between the digital images), but a relationship, association, connection or context (e.g., a scenario type configuration) is set (provided) between certain digital images to allow the user to store, retrieve and otherwise manage the digital images more efficiently and effectively. In addition, because the digital images have a logical relationship established with each other according to subjectivity of the user, user convenience can be enhanced in managing the stored digital images.

In addition, as when the user uploads digital images to a blog or web site, a short script (or other description) can be added to the digital images stored in (or obtained by) the mobile terminal, and multiple digital images can have a meaningful relationship by connecting certain digital images in a particular storage area (e.g., the memory of the mobile terminal or on a blog site) by using certain keywords (or phrases) as hyper-links. These characteristics in the embodiments of the present invention allow the user to create various digital image applications and enables the user of a mobile terminal to interact with his online blog page (or other web site).

To implement at least the above features in whole or in part, exemplary embodiments of the present invention provide an apparatus for managing digital images of a mobile terminal that may include: a storage unit for storing a plurality of images; and a control unit for creating a script for a particular image according to a user instruction, and linking a second image stored in the storage unit or in an external device to the created script.

The control unit may link at least one or more images to the script according to the user instruction.

The control unit may set at least one or more link key words to the script according to a user instruction.

The control unit may set a particular word or phrase of the script as a key word for a hyper-link, and link the set key word and the second image.

The external device can be a server of a network to which the mobile terminal can be connected.

The control unit may include an editing unit for creating, correcting and deleting the script; and a link setting unit for setting a particular word or a phrase of the script as a link key word according to a user instruction, and linking the second image to the corresponding key word.

To implement at least the above features in whole or in part, the present invention also provides a method for managing digital images of a mobile terminal that may include: loading a stored specific image and creating a script; selecting an image for a hyper-link; and linking the selected image to a specific word or a phrase of the script.

The linking step may include marking the specific word or phrase of the script as a key word of the hyper-link according to a user selection; and linking the key word and the selected image.

The present invention provides a mobile terminal that may comprise: a memory adapted to store digital images and other information; an output unit adapted to provide to a user at least one of a visual, audible and tactile output that is related to the stored digital images; and a processor adapted to cooperate with the memory and the output unit in order to select a particular digital image and establish a relationship with one or more other digital images via a descriptive expression that is common to the particular digital image and the other digital images.

The descriptive expression may be entered and selected by the user via an input unit that cooperates with the processor. The input unit, the output unit and the processor may cooperate to allow the user to search for and retrieve multiple digital images by their common descriptive expression. The terminal may further comprise: a camera function module adapted to capture digital images and cooperating with the processor to store the captured digital images in the memory. The terminal may further comprise: a transceiver adapted to send and receive information with a network. The descriptive expression may be associated with hyper-text that allows connectivity with a network server via Internet access. The output unit may provide a text entry window that allows the user to enter text for the selected particular digital image via the input unit. The input unit may allow at least a portion of the text to be selected as the descriptive expression that is common to the particular digital image and the other digital images.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for managing images of a mobile terminal comprising:
a storage unit configured to store a plurality of images; and
a control unit configured to create, correct and delete a script for a particular image according to a user instruction, set a particular word or a phrase of the script as a link key word according to a user instruction, and link a second image stored in the storage unit or in an external device to the corresponding link key word,
wherein the control unit sets the particular word or phrase of the script as the link key word for a hyper-link, links the set link key word and the second image, links at least one or more images to the script according to a user instruction, and sets at least one or more link key words to the script according to a user instruction,
the control unit is further configured to correct and release settings of the hyper-link within the script,
when the script is deleted, the hyper-link for the script is released, and
the external device is a server of a network to which the mobile terminal can be connected.

2. The apparatus of claim 1, wherein the control unit comprises:
an editing unit configured to create, correct and delete the script; and
a link setting unit configured to set the particular word or the phrase of the script as the link key word according to the user instruction, and link the second image to the corresponding link key word.

3. A method for managing images of a mobile terminal comprising:
loading a stored specific image and creating a script using the mobile terminal;
selecting an image for a hyper-link using the mobile terminal;
marking a specific word or a phrase of the script as a key word of the hyper-link according to a user selection using the mobile terminal;
linking the key word and the selected image using the mobile termina; and
correcting and releasing settings of the hyper-link within the script,
wherein the image for the hyper-link has been stored in a storage unit of the mobile terminal or in a server of a network to which the mobile terminal can be connected,
when the script is deleted, the hyper-link for the script is released,
at least one or more images are linked to the script according to a user instruction, and
at least one or more link key words are set to the script according to a user instruction.

4. The method of claim 3, wherein after the specific image having the script is generated, when a user requests displaying of the corresponding specific image, the mobile terminal displays the script of the corresponding specific image together with the requested corresponding specific image.

5. The method of claim 4, wherein after the script is displayed, when the user selects a particular key word of the script, the mobile terminal displays a link image of the selected key word.

6. A mobile terminal, comprising:
a memory adapted to store digital images and other information;
an output unit adapted to provide to a user at least one of a visual, audible and tactile output that is related to the stored digital images; and
a processor adapted to cooperate with the memory and the output unit in order to select a particular digital image and establish a relationship with one or more other digital images via a descriptive expression that is common to the particular digital image and the other digital images, wherein the descriptive expression is entered and selected by the user via an input unit that cooperates with the processor, the output unit provides a text entry window that allows the user to enter text for the selected particular digital image via the input unit, and the input unit allows at least a portion of the text to be selected as the descriptive expression that is common to the particular digital image and the other digital images, wherein the processor is further adapted to set the at least a portion of the text as the descriptive expression for a hyper-link, links the set descriptive expression and the other digital images, links at least one or more images to the descriptive expression according to a user instruction, and sets at least one or more descriptive expressions to the text according to a user instruction, the processor is further adapted to correct and release settings of the hyper-link within the descriptive expression, when the script is deleted, the hyper-link for the descriptive expression is released, and the other digital images are stored in a server of a network to which the mobile terminal can be connected.

7. An apparatus for managing images of a mobile terminal comprising:

a storage unit configured to store a plurality of images; and a control unit configured to create a script for a particular image according to a user instruction, and link a second image stored in the store unit or in an external device to the created script, wherein the control unit comprises, an editing unit configured to create, correct and delete the script, and a link setting unit to set a particular word or a phrase of the script as a link key word according to a user instruction, and link the second image to the corresponding key word, wherein the link setting unit sets the particular word or the phrase of the script as the link key word for a hyper-link, links the set link key word and the second image, links at least one or more images to the script according to a user instruction, and sets at least one or more link key words to the script according to a user instruction, the link setting unit corrects and releases settings of the hyper-link within the script, when the script is deleted, the hyper-link for the script is released, and the external device is a server of a network to which the mobile terminal can be connected.

* * * * *